(12) United States Patent
Bentley et al.

(10) Patent No.: US 12,084,187 B2
(45) Date of Patent: Sep. 10, 2024

(54) PASSENGER SEAT ARREST MECHANISM

(71) Applicant: Safran Seats USA LLC, Gainesville, TX (US)

(72) Inventors: Paul R. Bentley, Gainesville, TX (US); Marc W. Kinard, Corinth, TX (US)

(73) Assignee: Safran Seats USA LLC, Gainesville, TX (US)

(*) Notice: Subject to any disclaimer, the term of this patent is extended or adjusted under 35 U.S.C. 154(b) by 97 days.

(21) Appl. No.: 17/921,612

(22) PCT Filed: Apr. 30, 2020

(86) PCT No.: PCT/US2020/030680
§ 371 (c)(1),
(2) Date: Oct. 26, 2022

(87) PCT Pub. No.: WO2021/221652
PCT Pub. Date: Nov. 4, 2021

(65) Prior Publication Data
US 2023/0166843 A1 Jun. 1, 2023

(51) Int. Cl.
*B64D 11/06* (2006.01)

(52) U.S. Cl.
CPC ........ *B64D 11/0619* (2014.12); *B64D 11/062* (2014.12)

(58) Field of Classification Search
CPC .............. B64D 11/0619; B60N 2/4221; B60N 2/42709; B60N 2/42745
See application file for complete search history.

(56) References Cited

U.S. PATENT DOCUMENTS 6,296,306 B1 * 10/2001 Specht .................. B60N 2/809
297/216.13
6,478,256 B1 * 11/2002 Williamson ....... B60N 2/42709
297/216.14

(Continued)

FOREIGN PATENT DOCUMENTS

| CN | 106741965 A | * | 5/2017 | ......... B64D 11/0619 |
| CN | 111497704 B | * | 5/2021 | ............... B60N 2/24 |

(Continued)

OTHER PUBLICATIONS

International Patent Application No. PCT/US2020/030680, International Search Report and Written Opinion, dated Jan. 25, 2021.

*Primary Examiner* — Timothy J Brindley
(74) *Attorney, Agent, or Firm* — Kilpatrick Townsend & Stockton LLP

(57) ABSTRACT

Described are devices and methods for arresting forward motion of a passenger seat back in a controlled manner using an energy absorbing element connected between structural elements of a pivotally-attached passenger seat back. The energy absorbing element includes an interference element and an energy absorbing element that are operably connected with each other so that, in an upright configuration, the combination of the energy absorbing element and the interference element resists movement of the passenger seat back with respect to the first structural element of the passenger seat back, and in transition to a folded-forward configuration, the interference element deforms the energy absorbing element to slow forward movement of the passenger seat back.

13 Claims, 6 Drawing Sheets

(56) References Cited

U.S. PATENT DOCUMENTS

| | | | |
|---|---|---|---|
| 7,766,424 B2 * | 8/2010 | Haglund | B60N 2/888 297/216.12 |
| 10,696,195 B2 * | 6/2020 | Young | B60N 2/42709 |
| 2012/0025570 A1 | 2/2012 | Reinck | |

FOREIGN PATENT DOCUMENTS

| | | |
|---|---|---|
| EP | 0945302 A1 | 9/1999 |
| EP | 2127941 A1 | 12/2009 |
| EP | 2706010 A2 | 3/2014 |
| EP | 3381805 A1 | 10/2018 |
| WO | 199205072 A1 | 4/1992 |
| WO | 199728983 A1 | 8/1997 |
| WO | WO-2018048363 A1 * | 3/2018 |

* cited by examiner

PASSENGER SEAT ARREST MECHANISM

FIELD OF THE INVENTION

The field of the invention relates to safety mechanisms for passenger seats.

BACKGROUND

In commercial aircraft, passenger safety and particularly the prevention of head injury are of paramount importance, with various structures directed to providing secure seating and avoiding passenger head impact with hard surfaces in turbulent or impact conditions. Unlike ground-based transport, air transport must cope with higher speeds and more limited space and weight constraints for safety devices. In existing aircraft designs, passenger seat backs are designed to break away when subjected to impact from behind. However, such mechanisms may redirect kinetic energy create unexpected hazards for passengers. Due to these and other structural and safety concerns, improved solutions for passenger impact safety are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an arrest mechanism for a passenger seat back, includes an energy absorbing element connected to a first structural element of a passenger seat back and an interference element connected to a second structural element of the passenger seat back. The energy absorbing element and the interference element can be operably connected with each other such that, in an first configuration corresponding to an upright passenger seat back, the energy absorbing element resists movement of the interference element, and a combination of the energy absorbing element and the interference element resists relative movement of the second structural element of the passenger seat back with respect to the first structural element of the passenger seat back. During transition from the first configuration to a second configuration, corresponding to a forward-folded passenger seat back, the interference element deforms the energy absorbing element to slow relative movement of the second structural element of the passenger seat back with respect to the first structural element of the passenger seat back. According to various embodiments, the arrest mechanism can include a deformable coil that can unwind in response to transitioning from the first configuration to the second configuration, a plate and a groove assembly where the interference element is positioned to deform a surface of the groove in response to transitioning from the first configuration to the second configuration, or a deformable rod that widens along a length of the rod so that the interference element removes material from an outer surface of the rod surface in response to the energy absorbing element transitioning from the first configuration to the second configuration.

According to certain embodiments of the present invention, a passenger seat can include a seat frame configured to connect with a passenger compartment, a first structural element of a passenger seat back connected with the seat frame, a second structural element of the passenger seat back rotatably connected with the first structural element such that the passenger seat back can rotate forward relative to the seat frame, and an arrest mechanism connected with the first and second structural elements. The arrest mechanism can include an energy absorbing element connected to one of the first structural element or the second structural element, and an interference element connected to the other one of the first structural element or the second structural element. The energy absorbing element and the interference element are operably connected with each other. In a first configuration corresponding to the passenger seat back being upright, the energy absorbing element resists movement of the interference element, and a combination of the energy absorbing element and the interference element resists relative movement of the second structural element of the passenger seat back with respect to the first structural element of the passenger seat back. During transition to a second configuration corresponding to the passenger seat back being folded forward, the interference element deforms the energy absorbing element to slow relative movement of the second structural element of the passenger seat back with respect to the first structural element of the passenger seat back.

According to certain embodiments of the present invention, in operation, the arrest mechanism can reduce the speed at which the passenger seat back folds forward in the event of abrupt deceleration, so that forward movement of a passenger seated and strapped in to the passenger seat is controlled in order to mitigate or prevent injury. In a first configuration corresponding to the passenger seat back being upright, the arrest mechanism can resist relative movement of the second structural element of the passenger seat back with respect to the first structural element of the passenger seat back via the energy absorbing element resisting initial deformation by the interference element. During transition to a second configuration corresponding to the passenger seat back being folded forward, the arrest mechanism can resist relative movement of the second structural element with respect to the first structural element in response to a force exerted on the second structural element causing the second structural element to pivot with respect to the first structural element thereby causing the interference element to deform the energy absorbing element.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide arrest mechanisms for exerting controlled counterforce to slow the forward movement of passenger seats as they break forward during rapid deceleration. The arrest mechanisms can resist initial forward movement, but generally operate by providing a substantially uniform resistance across a range of positions in order to slow the forward movement of the passenger seat back once it has begun to break forward. Arrest mechanisms as described herein are particularly suitable for a class of passenger seats that incorporate a form of upper-body restraint, e.g., a single shoulder belt, dual shoulder belt or harness, or other suitable upper-body restraint. Thus, unlike conventional passenger seat designs that are designed to break forward in response to impact from behind the seat, passenger seating assemblies as described herein are generally configured to resist both the initial impulse and the passenger's momentum throughout the range of forward movement. Exerting force consistently across the range of forward movement allows passenger seats that include the arrest mechanisms to decelerate the passenger at a rate that can be tuned to optimize safety and comfort, e.g., decelerating the passenger quickly enough to prevent head injury, but slowly enough to mitigate discomfort or minor injury from restraint. The counterforce exerted by the arrest mechanism can be tuned by the placement of the arrest mechanism (e.g., distance from a pivot point or fulcrum of the seta back), by material choice, and by the design and dimensions of the arrest mechanism (e.g., spring stiffness and dimensions). While the arrest mechanisms discussed for use with aircraft seats, they are by no means so limited. Rather, embodiments of the arrest mechanisms may be used in passenger seats or other seats of any type or otherwise as desired.

Figure 1A:
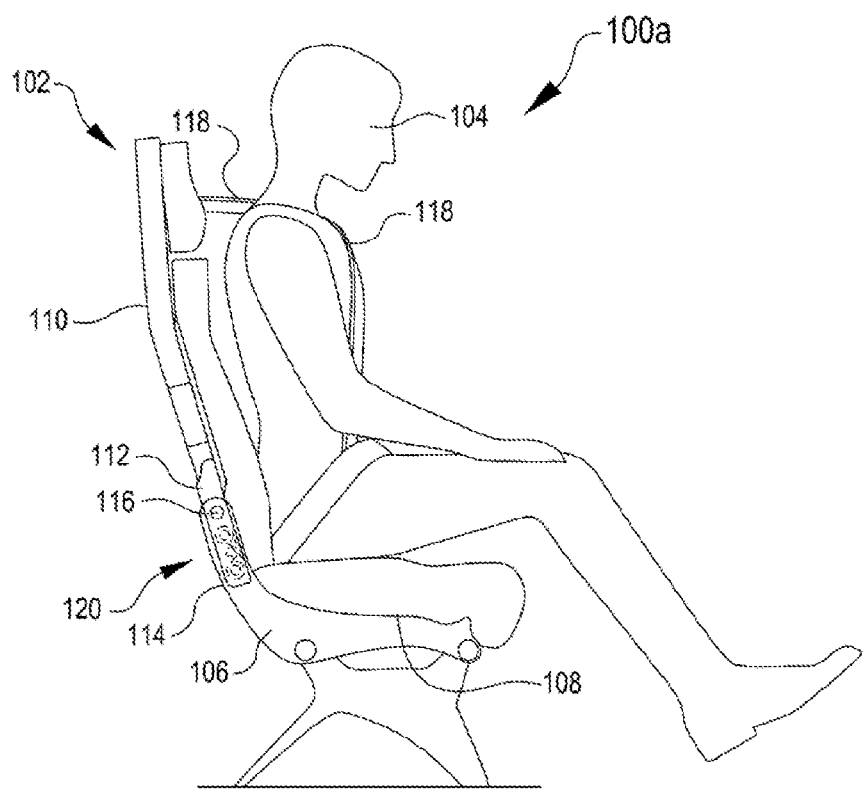
FIG. 1A is a side view showing a first example of a passenger seat with an arrest mechanism, in a first, upright configuration, according to certain embodiments of the present disclosure.
Figure 1B:
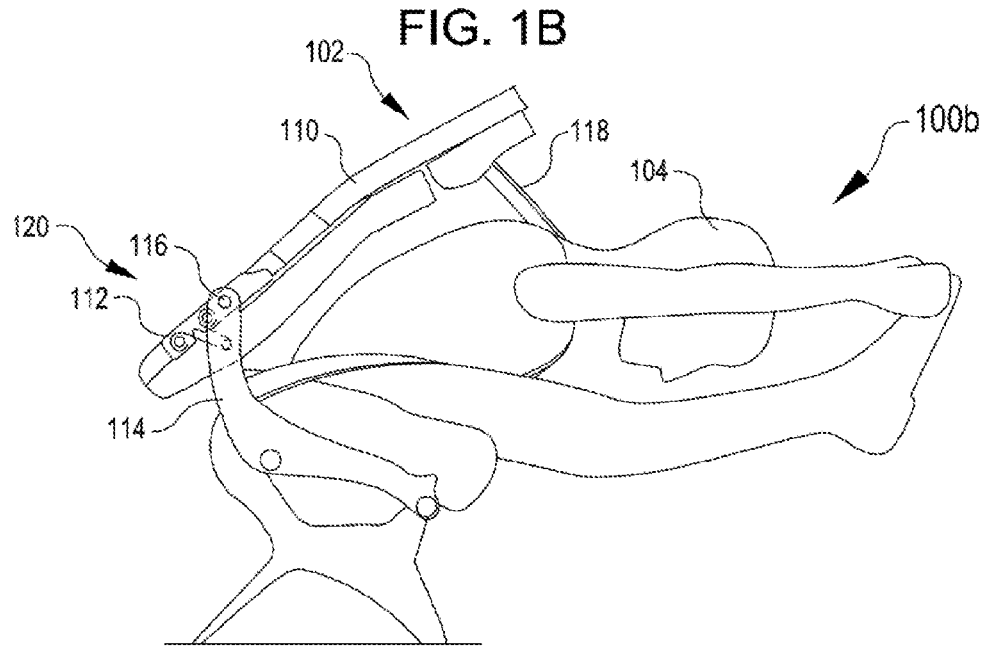
FIG. 1B is a second side view of the passenger seat of FIG. 1A, showing the passenger seat in a second, folded configuration, according to certain embodiments of the present disclosure.

According to certain embodiments of the present invention, as shown in FIG. 1A and FIG. 1B, a passenger seat in a first, upright configuration 100a can transition to a second, folded configuration 100b in response to forward momentum of a passenger 104 held by a shoulder restraint 118 that is attached to a passenger seat back 110 of the passenger seat. The operation of folding forward, as opposed to remaining static, allows the passenger seat back 110 to follow the momentum of the passenger 104 while exerting counterforce via the shoulder restraint 118 in a manner that applies the counterforce more gradually than the shoulder restraint of an alternative, static seat back.

The passenger seat 102 includes a seat bottom frame 106 that supports a seat bottom 108 and also a hinge 116 to which the passenger seat back 110 is attached. The passenger seat back 110 can rotatably attach to the seat bottom frame 106 at the hinge 116 so that, when sufficient force is exerted on the passenger seat back, it can break forward at the hinge and fold forward from the first, upright configuration 100a to the second, folded configuration 100b. The passenger seat back 110 is attached to the seat bottom frame 106 with a lower portion 112 of the passenger seat back extending below the hinge 116 in order to partially overlap with an upper portion 114 the seat bottom frame 106. An arrest mechanism 120 is attached to the passenger seat 102 at both the lower portion 112 of the passenger seat back 110 and the overlapping, upper portion 114 of the seat bottom frame 106. As shown in FIG. 1B, in response to the transition of the passenger seat back 110 from the first configuration 100a to second configuration 100b, the arrest mechanism 120 deforms as the lower portion 112 of the passenger seat back pivots away from the upper portion 114 of the seat bottom frame 106 while remaining attached to both, and the deformation of the arrest mechanism exerts a counterforce against the transition of the passenger seat back.

Figure 2:
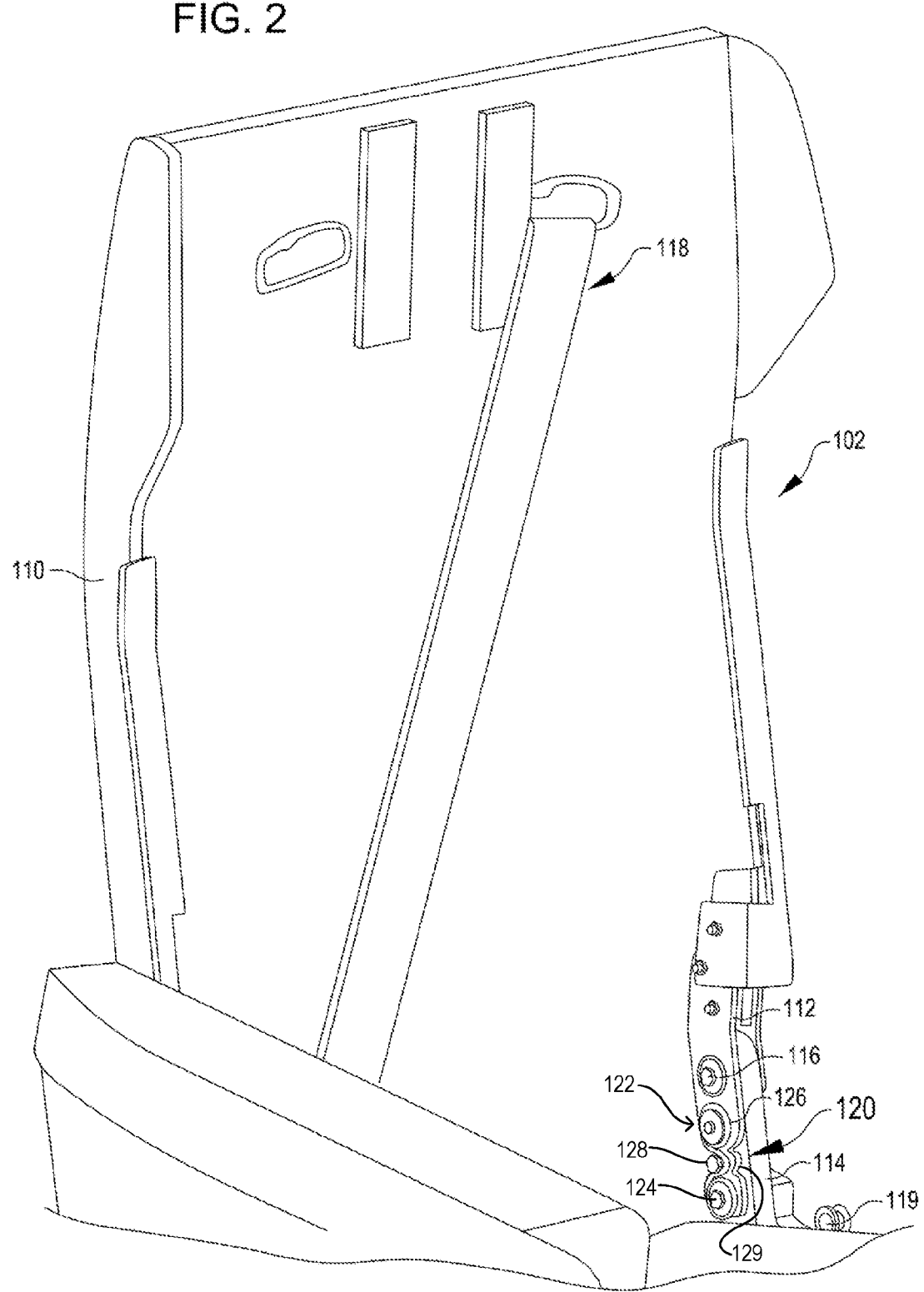
FIG. 2 is a perspective view showing the passenger seat of FIGS. 1A and 1B, in greater detail.

FIG. 2 shows the structural elements of the passenger seat back 110 of FIGS. 1A and 1B in a simplified profile view, without cushioning, and with an embodiment of the arrest mechanism 120 exposed. Shoulder restraint 118 can be arranged to pass over the seat diagonally in use either over a passenger's left shoulder or right shoulder, and can include a three point harness that also serves as a lap belt and may attach to the seat bottom frame, e.g. via belt attachment element 119.

According to various embodiments, the arrest mechanism 120 can include an energy absorber 122 mounted to the lower portion 112 of the passenger seat back 110, and an interference element 128 mounted to the upper portion 114 of the seat bottom frame 106. The energy absorber 122 includes a coiled wire spring 126 connected to the lower portion 112 of the passenger seat back 110 via a pair of coil retainers 124. Where the coiled wire spring 126 passes between the pair of coil retainers 124, the coiled wire spring is partially wound about and forward of the interference element 128. According to some embodiments, the interference element 128 can pass through the lower portion 112 of the passenger seat back 110 with depressions 129 in the lower portion 112 positioned to weaken the lower portion of the passenger seat back immediately adjacent to the interference element so that, when the passenger seat back folds forward about the hinge 116, the weekend portion breaks outward. According to various other embodiments, the interference element can rest in a groove from the forward part of the lower portion 112 of the passenger seat back. The operation of the arrest mechanism 120 is described in greater detail below with reference to FIGS. 3A and 3B.

Figure 3A:
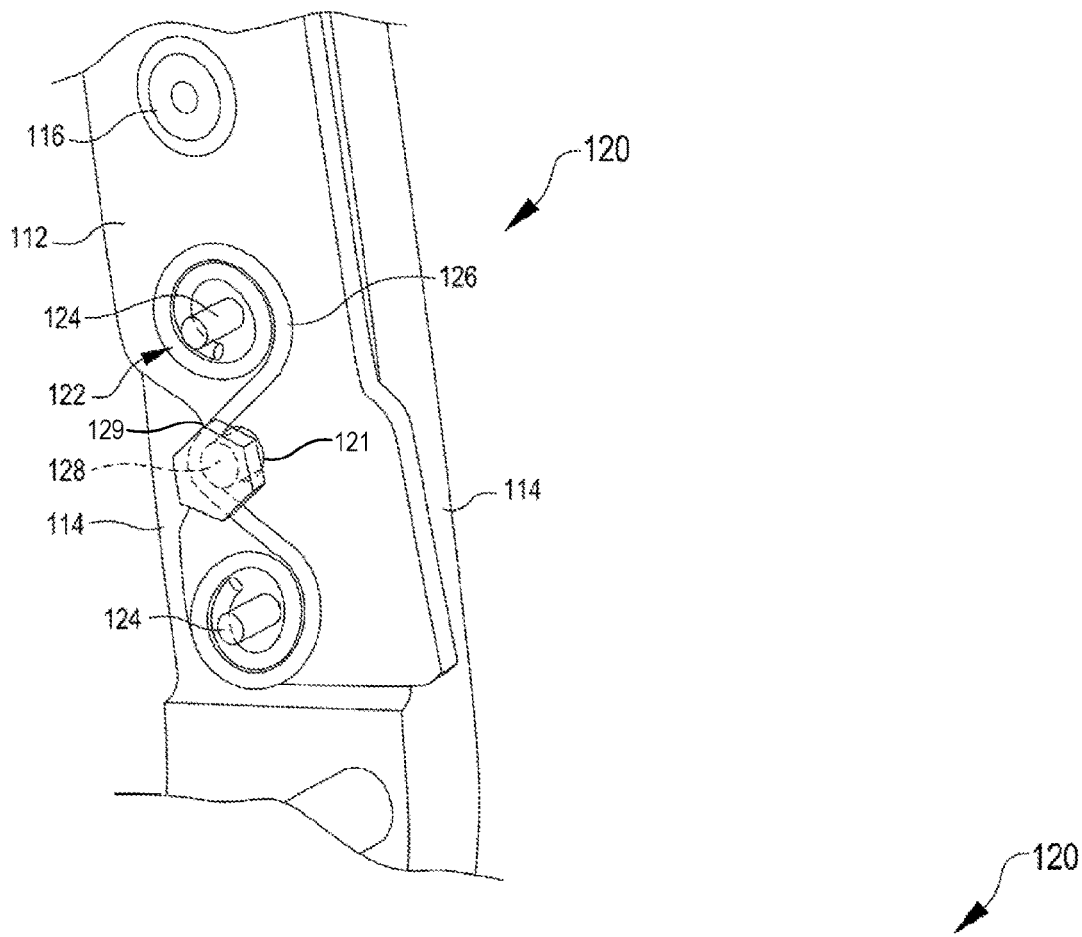
FIG. 3A is a side section view illustrating an example of a first arrest mechanism for the passenger seat of FIG. 1A through FIG. 2, illustrating the first configuration of the arrest mechanism in greater detail.
Figure 3B:
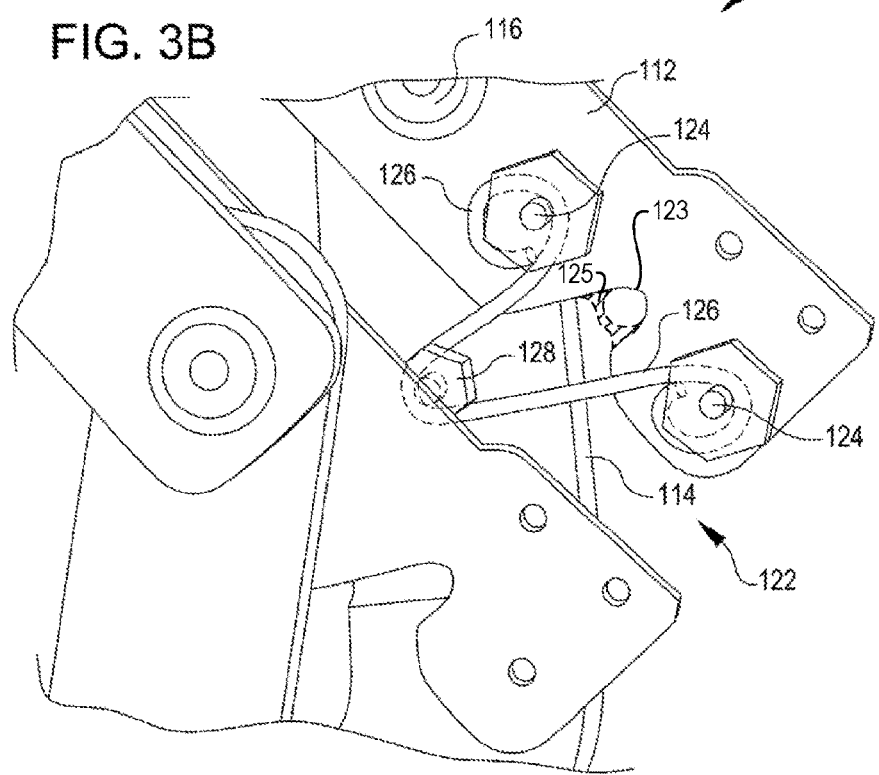
FIG. 3B is a second side section view of the passenger seat of FIG. 1B, illustrating the second configuration of the arrest mechanism in greater detail.

According to certain embodiments of the present invention, as shown in FIG. 3A, when the passenger seat back 110 is upright, the lower portion 112 of the passenger seat back is aligned with the upper portion 114 of the seat bottom frame 106. The coiled wire spring 126 of the energy absorber 122 is tightly coiled about the coil retainers 124 and in contact with the interference element 128. In response to forward impulse, e.g. by the momentum of a strapped in passenger, the passenger seat back 110 is pulled forward and pivots around the hinge 116. In response, the lower portion 112 of the passenger seat back 110 pivots aft in the opposite direction, while the interference element 128 remain stationary and attached to the upper portion 114 of the seat bottom frame 106. The relative movement of the interference element 128 and the energy absorber 122 causes the interference element to pull the coiled wire spring 126, causing it to plastically deform and unwind from the coil retainers 124.

According to some embodiments, the interference element 128 passes through a through hole 121 in the lower portion 112 of the passenger seat back 110, and the initial impulse on the passenger seat back causes the interference element 128 to break out removable material 125 adjacent the through hole when the passenger seat back begins to fold forward, forming a groove 123. According to various other embodiments, the lower portion 112 of the passenger seat back 110 can be formed with the groove 123, and the passenger seat back 110 can be retained in the upright configuration by the interaction of the energy absorber 122 and the interference element 128 without additional structural support.

In operation, the arrest mechanism 120 prevents or mitigates passenger injury by allowing forward break over of the passenger seat back 110 in response to an initial forward impulse, and by absorbing kinetic energy via deformation of the energy absorber 122 over a range of movement of the passenger seat back. Various specific configurations of the coiled wire spring 126 can be used without deviating from the spirit of the present disclosure, including embodiments where the coiled wire spring 126 is fixed at one coil retainer 124 and wound about the other coil retainer, or where the coiled wire spring 126 is wound about the interference element 128. According to various alternative embodiments, the coiled wire spring 126 can be mounted to the upper portion 114 of the seat bottom frame 106 instead of the lower portion 112 of the passenger seat back 110, in which case the interference element 128 would be attached to the passenger seat back. Alternative embodiments of the arrest mechanism 120 can be based on material removal or ablation rather than plastic deformation of the spring, as described below with reference to FIG. 4 and FIG. 5.

Figure 4:
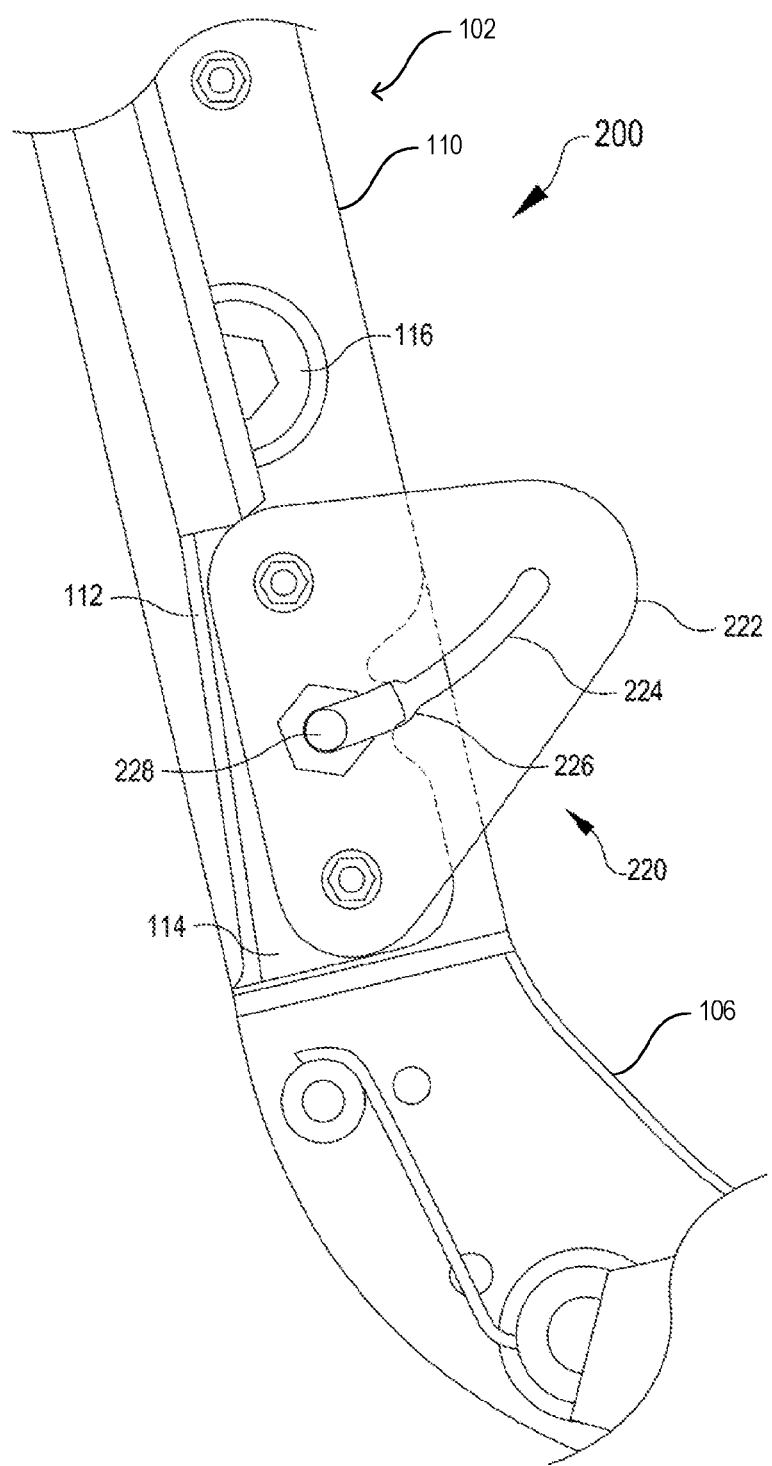
FIG. 4 is a side section view illustrating an example of a second arrest mechanism for the passenger seat of FIGS. 1A and 1B, in accordance with various embodiments.

According to certain embodiments of the present invention, as shown in FIG. 4, in an alternative passenger seat assembly 200, an alternative arrest mechanism 220 can be mounted to the passenger seat 102, in which the arrest mechanism 220 includes an energy absorbing plate 222. The energy absorbing plate 222 includes a groove 224 positions to receive the interference element 228 in response to the passenger seat back 110 breaking forward around hinge 116. The energy absorbing plate 222 can be mounted to the lower portion 112 of the passenger seat back 110, and in operation, the energy absorbing plate 222 will rotate aft around the hinge 116 causing the groove 224 to move relative to the interference element 228. When the interference element 228 encounters a constriction 226 in the width of the groove 224, the interference element imparts a counterforce on the rotation of the passenger seat back 110, and the energy absorbing plate 222 dissipates the kinetic energy of the passenger seat back and the seated passenger via deformation (i.e., ablation) of an inner surface of the groove 224. According to some specific embodiments, the groove 224 in the energy absorbing plate 222 can decrease in width across the constriction 226 from a first width in a range of about 0.584 to 0.609 cm, to a second width in a range of about 0.577 to 0.607 cm.

Similar to energy absorber 122, the alternative energy absorbing plate 222 can be mounted in reverse, e.g., with the energy absorbing plate 222 mounted to the upper portion 114 of the seat bottom frame and the interference element 228 mounted to the lower portion 112 of the passenger seat back 110. The energy absorbing plate 222 can also be used in conjunction with breakaway material in the lower portion 112 of the passenger seat back 110 in order to provide static structural strength, or alternatively, the interaction of the energy absorbing plate 222 and the interference element 228 can be sufficient to prevent break over of the passenger seat back 110 without additional support.

Figure 5:
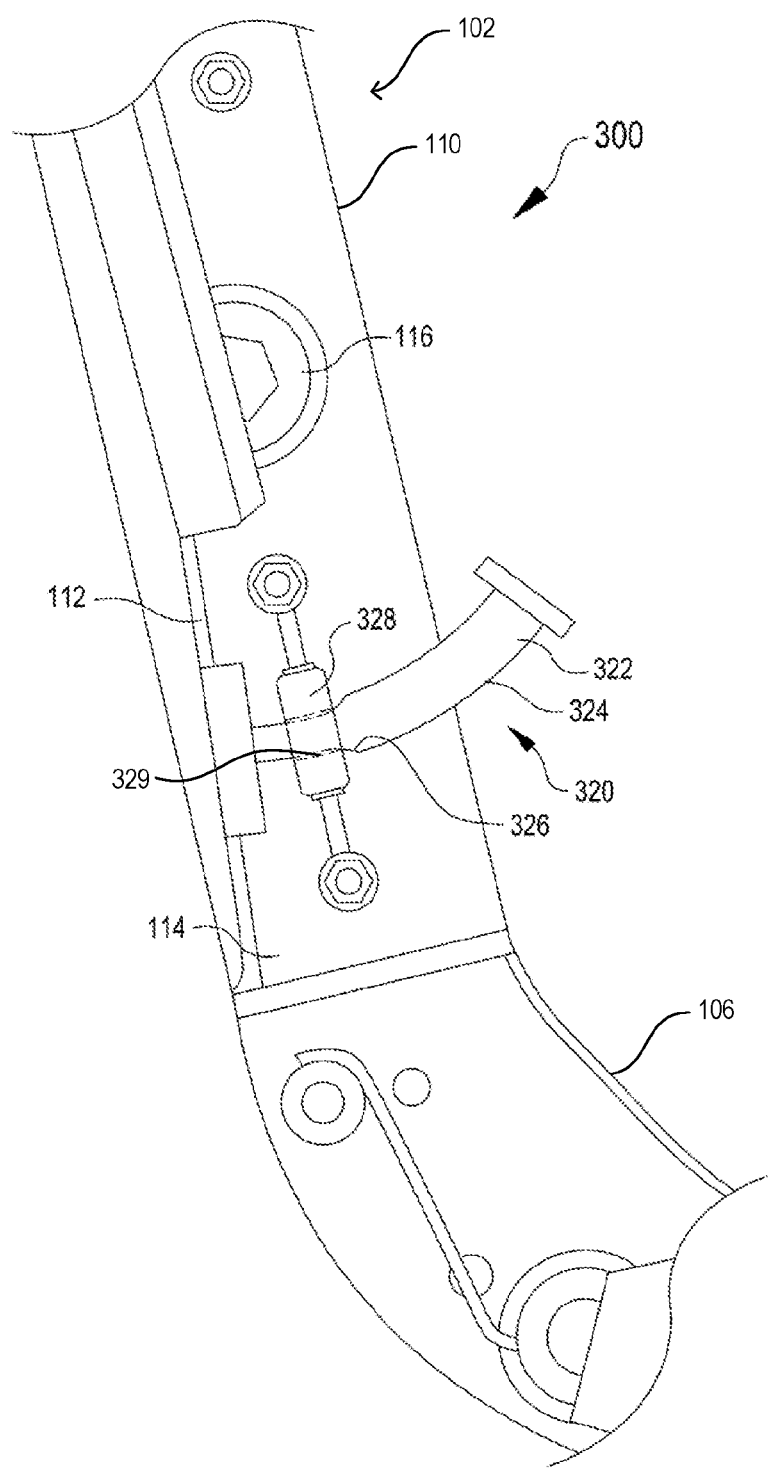
FIG. 5 is a side section view illustrating an example of a third arrest mechanism for the passenger seat of FIGS. 1A and 1B, in accordance.

According to certain embodiments of the present invention, in another alternative passenger seat assembly 300 as shown in FIG. 5, an alternative arrest mechanism 320 can be mounted to the passenger seat 102, in which the arrest mechanism 320 includes an energy absorbing rod 322. The energy absorbing rod 322 includes a taper 326 to a widened section 324 that exceeds a diameter of an interference element 328 mounted to the upper portion 114 of the seat bottom frame 106. The energy absorbing rod 322 can be shaped so that, when the passenger seat back 110 breaks forward and rotates about the hinge 116, the energy absorbing rod is pulled by the lower portion 112 of the passenger seat back through the interference element 328. In operation, the energy absorbing rod 322 passes through the interference element 328, where an inner surface 329 of the interference element 328 scrapes away or ablates material from the widened section 324 of the energy absorbing rod 322.

According to some embodiments, the energy absorbing rod 322 and the inner surface 329 of the interference element 328 can have the same shape, e.g., circular, elliptical, square, rectangular, or any other suitable cross-sectional shape. According to various other embodiments, the shapes of the inner surface 329 of the interference element 328 and the widened section 324 of the energy absorbing rod 322 can have different shapes. The widened section 324 of the energy absorbing rod 322 can extend uniformly or non-uniformly, i.e., according to some embodiments the energy absorbing rod widens from a first cross-sectional area to a second cross-sectional area having the same shape at the taper 326. Alternatively, the widened section 324 of the energy absorbing rod can include partial extensions of the cross-sectional area that do not identically match the cross-sectional shape of a remainder of the energy absorbing rod. The amount and the shape by which the cross-sectional area of the energy absorbing rod 322 increases at the widened section 324 can be selected to tune the amount of resistance that the energy absorbing rod provides against force on the passenger seat back, e.g., increasing the amount of material in the widened section to increase the counterforce that can be generated by the arrest mechanism 320, or decreasing the amount of material in order to decrease the counterforce provided. According to some specific embodiments, the energy absorbing rod can increase in cross-sectional area across the taper 326 from a first cross-sectional area of about 1.210 to 1.260 $cm^2$, to a second cross-sectional area of about 1.265 to 1.315 $cm^2$.

Similar to energy absorber 122 or energy absorbing plate 222, the alternative energy absorbing rod 322 can be mounted in reverse, e.g., with the energy absorbing rod 322 mounted to the upper portion 114 of the seat bottom frame and the interference element 328 mounted to the lower portion 112 of the passenger seat back 110. The energy absorbing rod 322 can also be used in conjunction with breakaway material in the lower portion 112 of the passenger seat back 110 in order to provide static structural strength, or alternatively, the interaction of the energy absorbing rod 322 and the interference element 328 can be sufficient to prevent break over of the passenger seat back 110 without additional support.

In the various embodiments of energy absorbers 122, 222, 322 described above, the relative movement of the energy absorber relative to an interference element is slowed by a counterforce exerted by the interaction of the energy absorber and interference element caused by plastic deformation of the energy absorber, e.g., the unwinding of a coiled spring, or ablation of material from an energy absorbing plate or rod. The amount of resistance provided by the energy absorber can be tuned by selecting the deformable material of the energy absorber (e.g., aluminum alloy, steel, magnesium alloy, polymer or polymer composite). According to various embodiments, the deformable material of the energy absorber is selected to have a lower strength and hardness than the corresponding interference element (e.g., interference elements 128, 228, 328), which may be formed of a harder alloy. For example, interference elements 128, 228, 328 can be a harder material such as, but not limited to, hardened steel; whereas energy absorbing plate 222 and energy absorbing rod 322 may be a softer aluminum or aluminum alloy.

In general, deformation of the energy absorber is plastic and does not result in significant elastic effects, and does not obstruct movement of the energy absorber in a reverse direction relative to the interference element after the passenger seat back 110 has folded forward and deformed the energy absorber, such that operation of the arrest mechanisms 120, 220, 320 described above does not cause obstruction of a row of passenger seats. The interaction of the interference element and energy absorbing element is generally can be tuned to provide any suitable counterforce against movement of the second structural element (i.e., the seat back), depending on the dimensions of the passenger seat back, the length of the lever arm between the hinge and arrest mechanism, and the operational forces expected for the passenger seat. According to some embodiments, the arrest mechanism is configured to exert at least 17.8 kN against the second structural element during transition from the first configuration to the second configuration. The amount of force exerted can be consistent across the range of movement of the seat back, e.g., to within a range of 17.8 kN to 18.9 kN across an entire range of motion of the second structural element, or within another suitable range depending on the specific seat geometry and requirements.

Structural elements of the seats (e.g. passenger seat 102, passenger seat back 110, seat bottom frame 106), as well as any intervening structural elements or attachment elements therein, may be formed of materials including but not limited to aluminum, stainless steel, aramid fibers, polycarbonate, polypropylene, other metallic materials, composite materials, or other similar materials.

Figure 6:
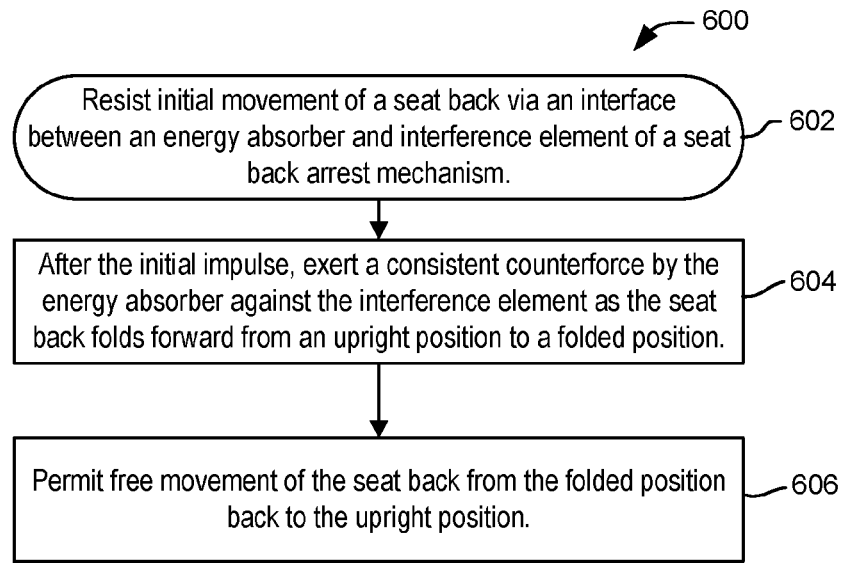
FIG. 6 is a process flow diagram illustrating an example process for arresting forward movement of a seat back via an arrest mechanism.

FIG. 6 is a process flow diagram illustrating a first example process 600 for gently arresting forward movement of a passenger seat back using a seat back arrest mechanism according to any of the embodiments of arrest mechanisms described herein. Initially, a passenger seat back is oriented in a first, upright configuration, in which the seat back arrest mechanism resists initial movement of the seat back. (Act 602). Resisting initial movement by the seat back can be performed by a breakaway component, or can be performed by the interaction of an energy absorber and interference element of the seat back arrest mechanism. Forward breakaway, or folding, by the passenger seat back occurs in response to force exerted on the passenger seat, e.g., by the momentum of a seated passenger in the event of abrupt deceleration, such as might be expected during an emergency landing or severe turbulence. In response to an initial impulse, the passenger seat back begins to fold forward around a hinged connection between the passenger seat back and seat bottom frame. After initial breakaway, the forward folding movement of the passenger seat back is resisted by a consistent counterforce exerted across the range of movement by an energy absorbing deformation of the energy absorber as it is acted on by the interference element. (Act 604). After the passenger seat back has completed its transit from the upright, first configuration to the fully collapsed, second configuration, the deformed energy absorber does not impede free movement of the passenger seat back in the reverse direction, allowing the seat back to be returned readily to an upright configuration so that the passenger seat back does not impede egress.

Figure 7:
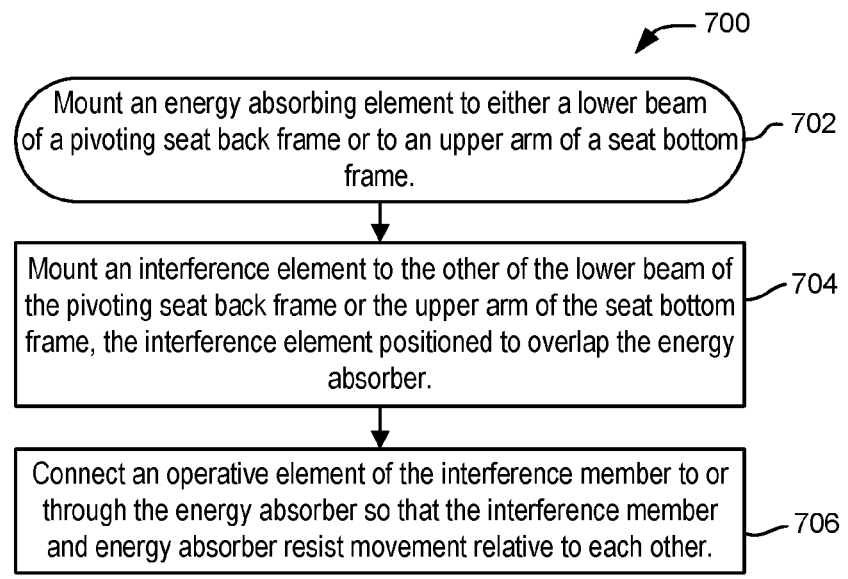
FIG. 7 is a process flow diagram illustrating an example process for installing an arrest mechanism to a passenger seat.

FIG. 7 is a process flow diagram illustrating an example process 700 for the installation of a seat back arrest mechanism, according to any of the embodiments of arrest mechanisms as described above. The arrest mechanism is installed to both the lower beam of a pivoting seat back frame, i.e. below a hinge, and to the overlapping portion of the seat bottom frame, at a location where the seat back frame pivots away and separates from the seat bottom frame when the seat back folds forward. (Act 702). According to various embodiments, the interference element can be attached directly to the seat bottom frame, or alternatively, to the lower portion of the passenger seat back below the hinge. (Act 704). The energy absorber can then be attached to the other of the seat bottom frame or lower portion of the passenger seat back, with the operative element (e.g., the energy absorbing coil spring, plate, or rod) connected to interface with the interference element. (Act 706).

In the following, further examples are described to facilitate the understanding of the invention:

Example A. An arrest mechanism for a passenger seat back, comprising:
an energy absorbing element connected to a first structural element of a passenger seat back;
an interference element connected to a second structural element of the passenger seat back; wherein the energy absorbing element and the interference element are operably connected with each other such that:
in an first configuration corresponding to an upright passenger seat back, the energy absorbing element resists movement of the interference element, and a combination of the energy absorbing element and the interference element resists relative movement of the second structural element of the passenger seat back with respect to the first structural element of the passenger seat back; and
during transition from the first configuration to a second configuration corresponding to a forward-folded passenger seat back, the interference element deforms the energy absorbing element to slow relative movement of the second structural element of the passenger seat back with respect to the first structural element of the passenger seat back.

Example B. The arrest mechanism of the preceding example, wherein the energy absorbing element comprises a deformable coil, the interference element positioned to cause the deformable coil to unwind in response to transitioning from the first configuration to the second configuration.

Example C. The arrest mechanism of any preceding example, wherein the deformable coil comprises a constant force spring that exerts a consistent counterforce in response to the deformable coil being unwound by the interference element exerting force on the deformable coil.

Example D. The arrest mechanism of any preceding example, wherein the energy absorbing element comprises a plate and a groove, the groove aligned with the interference element, the groove having a groove width that is smaller than an interference element width of the interference element, the interference element positioned to deform a surface of the groove in response to transitioning from the first configuration to the second configuration.

Example E. The arrest mechanism of any preceding example, wherein the energy absorbing element comprises a deformable rod that widens along a length of the rod, the interference element configured to remove material from an outer surface of the rod surface in response to the energy absorbing element transitioning from the first configuration to the second configuration.

Example F. A passenger seat, comprising:
a seat frame configured to connect with a passenger compartment;
a first structural element of a passenger seat back connected with the seat frame;
a second structural element of the passenger seat back rotatably connected with the first structural element such that the passenger seat back can rotate forward relative to the seat frame; and
an arrest mechanism, comprising:
an energy absorbing element connected to one of the first structural element or the second structural element;
an interference element connected to the other one of the first structural element or the second structural element;
wherein the energy absorbing element and the interference element are operably connected with each other such that:
  in a first configuration corresponding to the passenger seat back being upright, the energy absorbing element resists movement of the interference element, and a combination of the energy absorbing element and the interference element resists relative movement of the second structural element of the passenger seat back with respect to the first structural element of the passenger seat back; and
  during transition to a second configuration corresponding to the passenger seat back being folded forward, the interference element deforms the energy absorbing element to slow relative movement of the second structural element of the passenger seat back with respect to the first structural element of the passenger seat back.

Example G. The passenger seat of the preceding example, wherein the energy absorbing element comprises a deformable coil, the interference element positioned to cause the deformable coil to unwind in response to transitioning from the first configuration to the second configuration.

Example H. The passenger seat of any preceding example, wherein the energy absorbing element comprises a plate and a groove, the groove aligned with the interference element, the groove having a groove width that is smaller than an interference element width of the interference element, the interference element positioned to ablate a surface of the groove in response to transitioning from the first configuration to the second configuration.

Example I. The passenger seat of any preceding example, wherein the energy absorbing element comprises a deformable rod that widens along a length of the rod, the interference element configured to remove material from an outer surface of the rod surface in response to the energy absorbing element transitioning from the first configuration to the second configuration.

Example J. The passenger seat of any preceding example, wherein the passenger seat further comprises a shoulder restraint.

Example K. The passenger seat of any preceding example, wherein the interaction of the interference element and energy absorbing element exerts a counterforce of at least 17.8 kN against the second structural element during transition from the first configuration to the second configuration.

Example L. The passenger seat of any preceding example, wherein a counterforce exerted against the second structural element during transition from the first configuration to the second configuration by the interaction of the interference element and energy absorbing element is consistent to within 17.8 to 18.9 kN across an entire range of motion of the second structural element.

Example M. The passenger seat of any preceding example, wherein the energy absorbing element is mounted to the first structural element and the interference element is mounted to the second structural element.

Example N. The passenger seat of any preceding example, wherein the energy absorbing element is mounted to the second structural element and the interference element is mounted to the first structural element.

Example O. The passenger seat of any preceding example, wherein the energy absorbing element does not resist a second transition of the arrest mechanism from the second configuration to the first transition after the energy absorbing element has been deformed by interaction with the interference element.

Example P. A method of arresting passenger seat back movement, comprising:
with an arrest mechanism connected with a first structural element of a passenger seat back and connected with a second structural element of the passenger seat back that is rotatably connected with the first structural element, the arrest mechanism comprising an energy absorbing element connected to one of the first structural element or the second structural element and an interference element connected to the other one of the first structural element or the second structural element,
in a first configuration corresponding to the passenger seat back being upright, resisting relative movement of the second structural element of the passenger seat back with respect to the first structural element of the passenger seat back via the energy absorbing element resisting initial deformation by the interference element; and during transition to a second configuration corresponding to the passenger seat back being folded forward, resisting relative movement of the second structural element with respect to the first structural element in response to a force exerted on the second structural element causing the second structural element to pivot with respect to the first structural element thereby causing the interference element to deform the energy absorbing element.

Example Q. The method of the preceding example, wherein the energy absorbing element comprises a deformable coil, the method further comprising:

resisting movement of the second structural element by the deformable coil unwinding in response to force exerted by the interference element on the deformable coil.

Example R. The method of any preceding example, wherein the energy absorbing element comprises a plate and a groove, the method further comprising:

resisting movement of the second structural element with respect to the first structural element by the interference element ablating an inner surface of the groove.

Example S. The method of any preceding example, wherein the energy absorbing element comprises a deformable rod that widens along a length of the rod, the interference element configured to remove material from an outer surface of the rod, the method further comprising:

resisting movement of the second structural element with respect to the first structural element by the interference element removing material from the outer surface of the rod as rod passes through the interference element.

Example T. The method of any preceding example, wherein the passenger seat further comprises a shoulder restraint connected with the second structural element, the method further comprising:

in response to a deceleration event, slowing forward movement of a passenger seated in the passenger seat by restraining the passenger via the shoulder restraint while resisting movement of the second structural element via the arrest mechanism.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An arrest mechanism for a passenger seat back, comprising:
   an energy absorbing element connected to a first structural element of a passenger seat back;
   an interference element connected to a second structural element of the passenger seat back; wherein the energy absorbing element and the interference element are operably connected with each other such that:
   in a first configuration corresponding to an upright passenger seat back, the energy absorbing element resists movement of the interference element, and a combination of the energy absorbing element and the interference element resists relative movement of the second structural element of the passenger seat back with respect to the first structural element of the passenger seat back; and
   during transition from the first configuration to a second configuration corresponding to a forward-folded passenger seat back, the interference element deforms the energy absorbing element to slow relative movement of the second structural element of the passenger seat back with respect to the first structural element of the passenger seat back, wherein the energy absorbing element comprises a deformable coil, the interference element positioned to cause the deformable coil to unwind in response to transitioning from the first configuration to the second configuration, the deformable coil comprising a constant force spring that is configured to exert a consistent counterforce in response to the deformable coil being unwound.

2. The arrest mechanism of claim 1, wherein the deformable coil is configured to plastically deform in unwinding in response to transitioning from the first configuration to the second configuration.

3. A passenger seat, comprising:
   a seat frame configured to connect with a passenger compartment;
   a first structural element of a passenger seat back connected with the seat frame;
   a second structural element of the passenger seat back rotatably connected with the first structural element such that the passenger seat back can rotate forward relative to the seat frame; and
   an arrest mechanism, comprising:
      an energy absorbing element connected to one of the first structural element or the second structural element;
      an interference element connected to the other one of the first structural element or the second structural element; wherein the energy absorbing element and the interference element are operably connected with each other such that:
      in a first configuration corresponding to the passenger seat back being upright, the energy absorbing element resists movement of the interference element, and a combination of the energy absorbing element and the interference element resists relative movement of the second structural element of the passenger seat back with respect to the first structural element of the passenger seat back; and
      during transition to a second configuration corresponding to the passenger seat back being folded forward, the interference element deforms the energy absorbing element to slow relative movement of the second structural element of the passenger seat back with respect to the first structural element of the passenger seat back, wherein the energy absorbing element comprises a deformable coil, the interference element positioned to cause the deformable coil to unwind in response to transitioning from the first configuration to the second configuration, the deformable coil comprising a constant force spring that is configured to exert a consistent counterforce in response to the deformable coil being unwound.

4. The passenger seat of claim 3, wherein the deformable coil is configured to plastically deform in unwinding in response to transitioning from the first configuration to the second configuration.

5. The passenger seat of claim 3, wherein the passenger seat further comprises a shoulder harness configured to restrain a passenger.

6. The passenger seat of claim 3, wherein the interaction of the interference element and energy absorbing element exerts a counterforce of at least 17.8 kN against the second structural element during transition from the first configuration to the second configuration.

7. The passenger seat of claim 3, wherein a counterforce exerted against the second structural element during transition from the first configuration to the second configuration by the interaction of the interference element and energy absorbing element is consistent to within a range of 17.8 kN to 18.9 kN across an entire range of motion of the second structural element.

8. The passenger seat of claim 3, wherein the energy absorbing element is mounted to the first structural element and the interference element is mounted to the second structural element.

9. The passenger seat of claim 3, wherein the energy absorbing element is mounted to the second structural element and the interference element is mounted to the first structural element.

10. The passenger seat of claim 3, wherein the energy absorbing element does not resist a second transition of the arrest mechanism from the second configuration to the first configuration after the energy absorbing element has been deformed by interaction with the interference element.

11. A method of arresting passenger seat back movement, comprising:
with an arrest mechanism connected with a first structural element of a passenger seat back and connected with a second structural element of the passenger seat back that is rotatably connected with the first structural element, the arrest mechanism comprising an energy absorbing element connected to one of the first structural element or the second structural element and an interference element connected to the other one of the first structural element or the second structural element,
in a first configuration corresponding to the passenger seat back being upright, resisting relative movement of the second structural element of the passenger seat back with respect to the first structural element of the passenger seat back via the energy absorbing element resisting initial deformation by the interference element; and
during transition to a second configuration corresponding to the passenger seat back being folded forward, resisting relative movement of the second structural element with respect to the first structural element in response to a force exerted on the second structural element causing the second structural element to pivot with respect to the first structural element thereby causing the interference element to deform the energy absorbing element, wherein the energy absorbing element comprises a deformable coil that comprises a constant force spring that exerts a consistent counterforce in response to the deformable coil being unwound, the method further comprising:
resisting movement of the second structural element by the deformable coil unwinding in response to force exerted by the interference element on the deformable coil.

12. The method of claim 11, wherein the deformable coil is configured to plastically deform in unwinding in response to transitioning from the first configuration to the second configuration.

13. The method of claim 11, wherein the passenger seat further comprises a shoulder restraint connected with the second structural element, the method further comprising:
in response to a deceleration event, slowing forward movement of a passenger seated in the passenger seat by restraining the passenger via the shoulder restraint while resisting movement of the second structural element via the arrest mechanism.

* * * * *